US006057544A

United States Patent [19]

Ishihara

[11] Patent Number: 6,057,544

[45] Date of Patent: May 2, 2000

[54] MASS SPECTROMETER

[75] Inventor: Morio Ishihara, Osaka, Japan

[73] Assignee: Jeol Ltd., Tokyo, Japan

[21] Appl. No.: 08/962,112

[22] Filed: Oct. 31, 1997

[30] Foreign Application Priority Data

Jan. 11, 1996 [JP] Japan .................................... 8-291655

[51] Int. Cl.[7] ............................. B01D 59/44; H01J 49/00

[52] U.S. Cl. ............................................. 250/287; 250/281

[58] Field of Search ..................................... 250/287, 286, 250/281, 427 R

[56] References Cited

U.S. PATENT DOCUMENTS

| | | | |
|---|---|---|---|
| 3,626,182 | 12/1971 | Cohen | 250/287 |
| 4,458,149 | 7/1984 | Muga | 250/287 |
| 4,625,112 | 11/1986 | Yoshida | 250/287 |
| 4,694,167 | 9/1987 | Payne et al. | 250/287 |
| 5,140,158 | 8/1992 | Post | 250/287 |
| 5,625,184 | 4/1997 | Vestal et al. | 250/287 |
| 5,627,369 | 5/1997 | Vestal et al. | 250/287 |
| 5,641,959 | 6/1997 | Hollee et al. | 250/287 |
| 5,661,300 | 8/1997 | Hansen et al. | 250/287 |
| 5,689,111 | 11/1997 | Dresch et al. | 250/287 |

*Primary Examiner*—Bruce Anderson

*Attorney, Agent, or Firm*—Webb Ziesenheim Logsdon Orkin & Hanson, P.C.

[57] ABSTRACT

There is disclosed a mass spectrometer capable of performing a mass analysis by accelerating ions to high energies. This spectrometer has a drift zone consisting of a conductive tube located in the ion path between the ion source and the analyzer. A voltage is applied to the drift zone from a voltage source via a switch such that the voltage applied to the drift zone is switched between a low potential V and an accelerating voltage Va of several kilovolts.

7 Claims, 4 Drawing Sheets

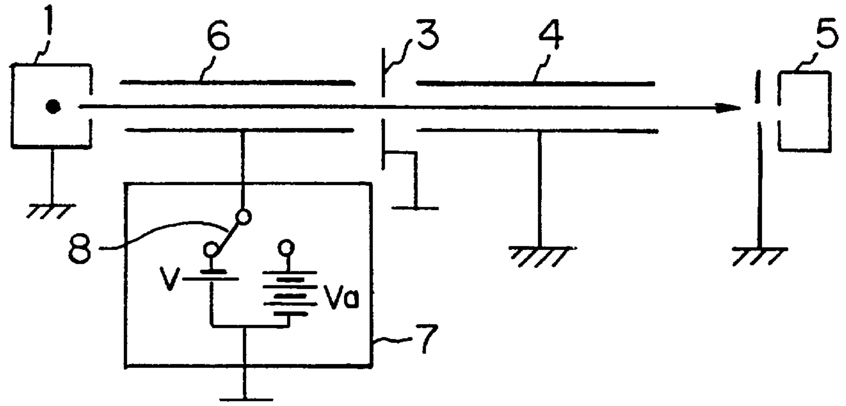
FIG. 1
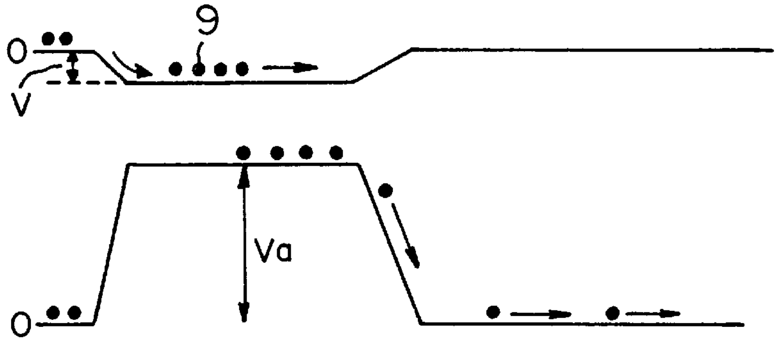
FIG. 2(a)
FIG. 2(b)
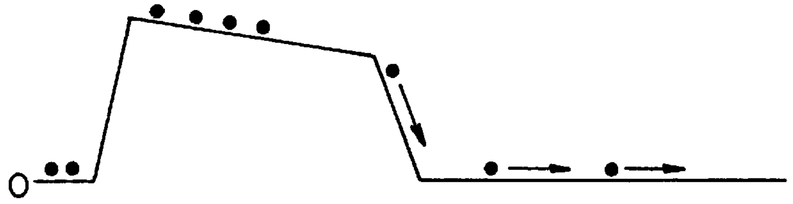
FIG. 3
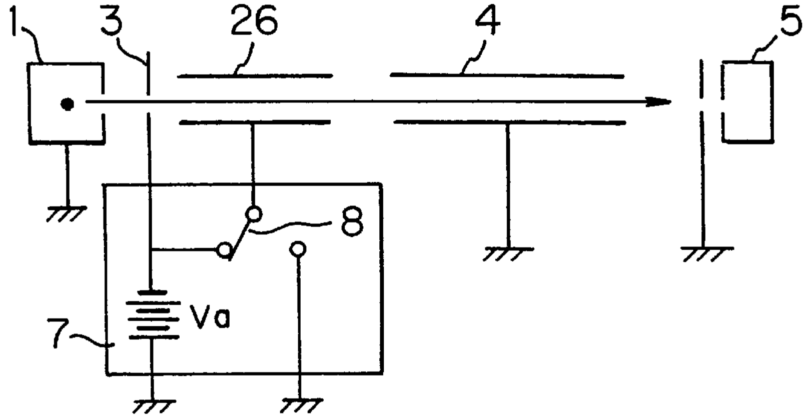
FIG. 4

MASS SPECTROMETER

FIELD OF THE INVENTION

The present invention relates to a mass spectrometer and, more particularly, to a mass spectrometer in which ions are accelerated by a high voltage and analyzed.

BACKGROUND OF THE INVENTION

Either in a magnetic mass spectrometer or in a time-of-flight mass spectrometer, ions are accelerated by a high voltage and introduced into an ion analyzer for performing a mass analysis. FIGS. 7(*a*) and 7(*b*) show a conventional mass spectrometer. FIG. 7(*a*) illustrates the manner in which a high voltage is applied to the ion source of the instrument. FIG. 7(*b*) illustrates the potentials at various locations in this instrument as well as the movement of ions. An accelerating voltage Va is applied to the ion source, indicated by 1, from an accelerating voltage source 2. The ions are accelerated by the high voltage, pass through a slit 3, and enter an ion analyzer 4 that is at ground potential. For example, this analyzer 4 is composed of an electric field and a magnetic field. In this analyzer 4, the ions are separated according to mass and detected by a detector 5 at ground potential.

In this instrument, a high voltage is impressed on the sample inlet portion of the ion source and so it is necessary to use an electrically insulative sample inlet device in introducing a sample. Furthermore, the ion source and the sample inlet portion need to be electrically isolated from the other portions. Especially where a gas chromatograph or liquid chromatograph is directly connected to the ion source and components separated by the chromatograph are introduced, it is highly likely that an electric discharge is produced due to a large potential differential across the interface between the ion source and the chromatograph.

Accordingly, a mass spectrometer whose ion source is placed at ground potential has been proposed, as shown in FIG. 8(*a*). The ion source, indicated by numeral 1, is at ground potential. Other components, i.e., an accelerating voltage source 2, a slit 3, an ion analyzer 4 and a detector 5, are electrically isolated from their surroundings and placed at a high negative potential. In this instrument, the sample inlet portion of the ion source can be placed at ground potential, as shown in FIG. 8(*b*). Therefore, any special device, such as an insulative sample inlet device, is unnecessary. Furthermore, this instrument has the advantage that connection with other analytical means, such as a gas chromatograph, is facilitated. However, it is necessary to provide a large-scale insulating mechanism, because a large potential difference exists between those components other than the ion source and ground potential. In addition, any countermeasure must be taken to prevent the human operator from getting an electric shock.

SUMMARY OF THE INVENTION

It is an object of the present invention to provide a mass spectrometer capable of maintaining its ion source, ion analyzer and detector at ground potential in operation.

This object is achieved in accordance with the teachings of the present invention by a mass spectrometer comprising an ion source placed at or near ground potential, an ion analyzer for mass analyzing ions extracted from the ion source, a detector for detecting ions emerging from the analyzer, a drift zone for accepting ions moving out of the ion source and a switching means. The drift zone is located between the ion source and the analyzer and made of a conductor surrounding the ion path. The switching means acts to switch the potential at the conductor from a low potential to a high potential in a response time shorter than the time taken by the ions to traverse the drift zone.

The present invention also provides a mass spectrometer comprising an ion source placed at or near ground potential, an ion analyzer for mass analyzing ions extracted from the ion source, a detector for detecting ions emerging from the analyzer, a flight tube for accepting ions moving out of the ion source and a switching means. The flight tube is located between the ion source and the analyzer and made of a conductor surrounding the ion path. The switching means acts to switch the potential at the flight tube from a high potential to ground or nearly ground potential in a response time shorter than the time taken by the ions to traverse the flight tube.

Other objects and features of the invention will appear in the course of the description thereof, which follows.

BRIEF DESCRIPTION OF THE DRAWINGS

FIG. 1 is a schematic diagram of a mass spectrometer in accordance with the present invention;

FIGS. 2(*a*) and 2(*b*) are diagrams illustrating the potential at various locations in the instrument shown in FIG. 1, as well as the movement of ions;

FIG. 3 is a diagram illustrating the potential gradient across the drift zone of the instrument shown in FIG. 1;

FIG. 4 is a schematic diagram of another mass spectrometer in accordance with the invention;

DESCRIPTION OF THE PREFERRED EMBODIMENTS

Figure 5A:
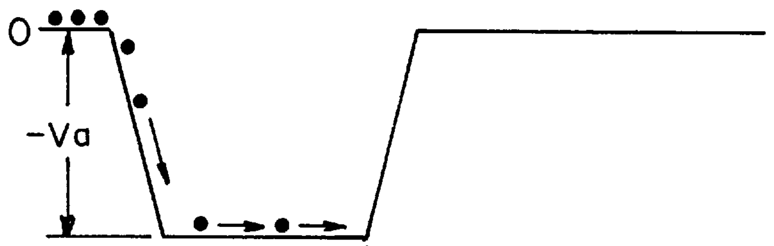
FIGS. 5(*a*) and 5(*b*) are diagrams illustrating the potential at various locations in the instrument shown in FIG. 4, as well as the movement of ions.

Referring to FIG. 1, there is shown a mass spectrometer embodying the concept of the present invention. This spectrometer includes an ion source 1, an ion analyzer 4 and a detector 5, all of which are placed at or near ground potential. A sector mass analyzer or a time-off-light (TOF) analyzer can be used as the analyzer 4. In this case, it is necessary to accelerate ions to high energies and analyze them.

A drift zone 6 consisting of a conductor tube is mounted in the ion path between the ion source 1 and the analyzer 4. A voltage is applied to this drift zone 6 from a voltage source 7 via a voltage selector switch 8. The voltage impressed on the drift zone 6 is switched between a low voltage V and an accelerating voltage Va of several kilovolts by the action of the switch 8. The low voltage V is low enough to permit unrestricted entry of ions.

Suppose that the ions generated in the ion source possess the positive charge. The potentials at various locations in the instrument are described by referring to FIGS. 2(*a*) and 2(*b*), along with the movement of the ions. When the drift zone is at low negative potential V, ions 9 produced by the ion source are accelerated by the low potential difference V and introduced into the drift zone, as shown in FIG. 2(*a*). The ions drift slowly through the drift zone and are accumulated.

After a sufficient amount of ions has accumulated in the drift zone, if the potential at the drift zone is switched to the accelerating voltage Va by the voltage selector switch 8 in a response time sufficiently shorter than the time taken for the ions to go across the drift zone, then the ions 9 accumulated in the drift zone are accelerated to high energies from the exit of the drift zone on the side of the analyzer by the potential difference Va with the slit 3 at ground potential, as shown in FIG. 2 (*b*). The ions then arrive at the analyzer, where they are separated according to mass and reach a detector. Finally, the ions are detected by this detector.

When the ions accumulated in the drift zone are being vented, the drift zone is kept at the accelerating voltage Va. Then, the potential at the drift zone is switched back to the low potential V by the switch 8. When a sufficient amount of ions accumulates, the potential is again switched to the accelerating voltage Va. In this way, ions are intermittently taken from the drift zone into the analyzer.

When the potential at the drift zone is high, as shown in FIG. 2(*b*), the ions generated by the ion source cannot enter the high potential drift zone. Therefore, the ions produced during this period are wastefully consumed. The potential at the drift zone need not be set uniform. If a small potential gradient is produced across the drift zone when the accelerating potential is applied as shown in FIG. 3, the ions move at increasing velocity toward the exit. Consequently, the ions accumulated in the drift zone can be quickly discharged toward the analyzer. This can reduce the time for which the drift zone is maintained at the accelerating voltage. Hence, the ion loss can be reduced.

Figure 6:
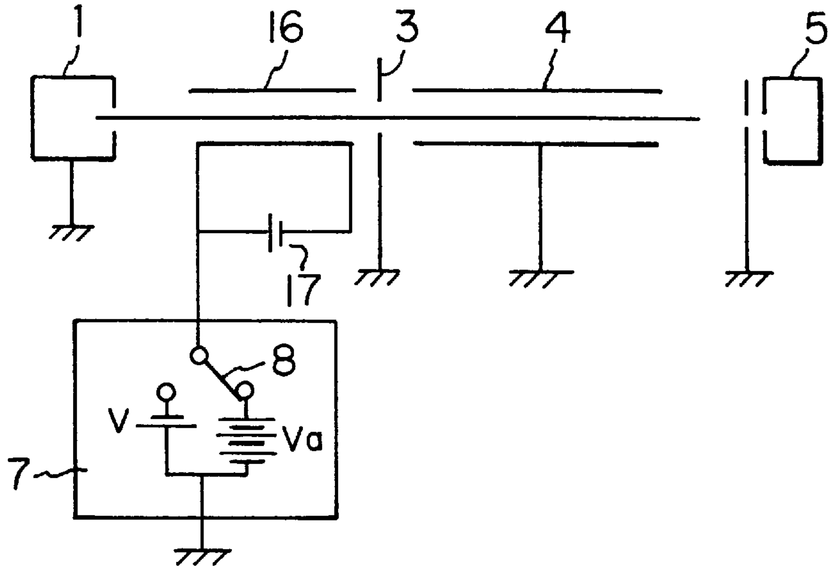
FIG. 6 is a schematic diagram of a further mass spectrometer in accordance with the invention.
Figure 7A:
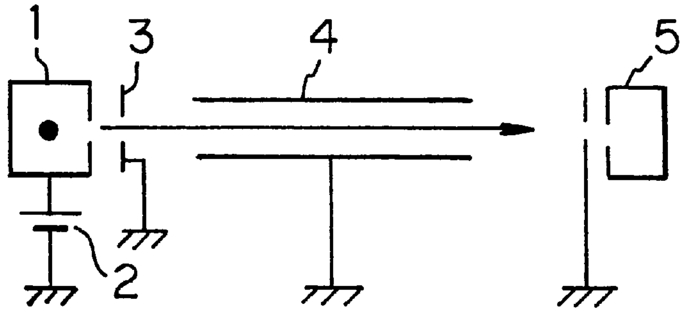
FIG. 7(a) PRIOR ART
FIGS. 7(*a*) and 7(*b*) are diagrams similar to FIGS. 2(*a*) and 2(*b*), respectively, but illustrating a conventional instrument.
Figure 7B:
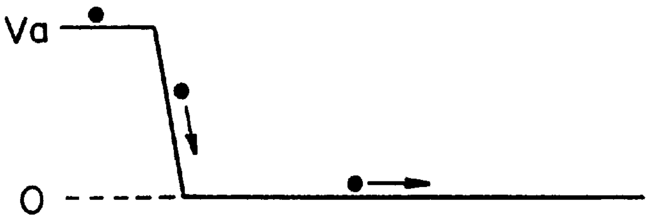
FIG. 7(b) PRIOR ART
Figure 8A:
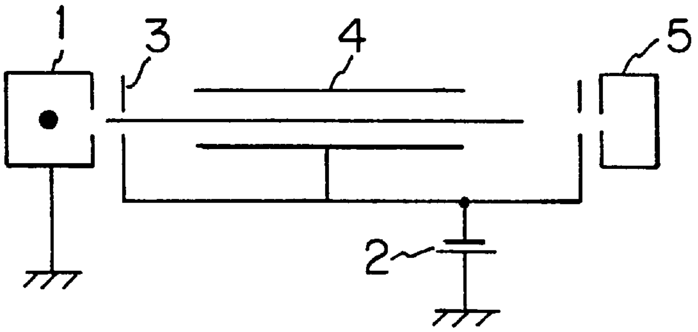
FIG. 8(a) PRIOR ART
FIGS. 8(*a*) and 8(*b*) are diagrams similar to FIGS. 2(*a*) and 2(*b*), respectively, but illustrating other conventional instruments.
Figure 8B:
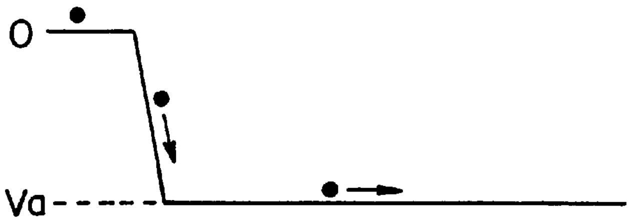
FIG. 8(b) PRIOR ART

FIG. 6 illustrates an instrument that is similar to the instrument described already in connection with FIG. 1 except that a configuration for producing such a potential gradient is added. In FIG. 6, a conductor 16 made of a resistor surrounds the drift zone. A power supply 17 supplies electrical current to this resistor, thus developing a potential difference between the entrance side and the exit side of the resistor. When the accelerating potential is applied, a small potential gradient is produced across the drift zone as shown in FIG. 3.

In the description provided thus far, the direction of movement of ions impinging on the drift zone is made coincident with the direction of movement of the outgoing ions. It is to be noted that this is not essential to the present invention. For instance, the incident direction may be made perpendicular to the exit direction. This example is illustrated in FIG. 9.

Figure 9:
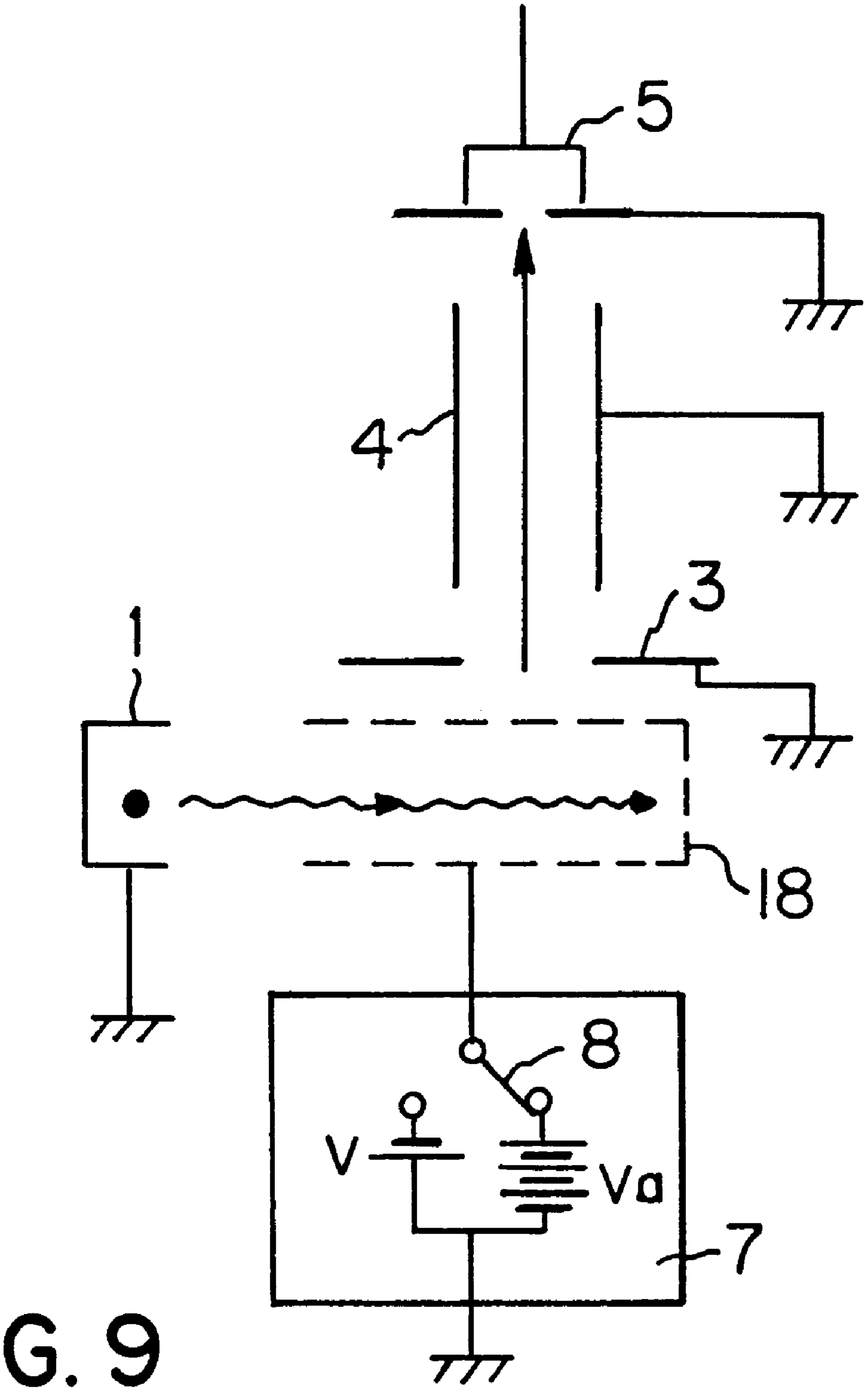
FIG. 9 is a schematic diagram of a yet other mass spectrometer in accordance with the invention.

Referring to FIG. 9, a conductor surrounding the drift zone is made of mesh. A slit 3 is disposed outside the conductor to take out ions in a direction perpendicular to the direction of drift of the ions. The ions taken out via the slit 3 are separated according to mass by an ion analyzer 4, and the separated ions are sequentially detected by a detector 5.

Referring next to FIG. 4, there is shown a yet other instrument in accordance with the invention. This instrument has an ion source 1 at ground potential. A slit 3 is disposed at the exit of the ion source 1, and is invariably applied with an accelerating potential −Va. A flight tube 26, an ion analyzer 4 at ground potential and an ion detector 5 are arranged in this order downstream of the slit 3. Ions travel through the flight tube 26. A voltage selector means 8 can switch the potential at the flight tube 26 between the accelerating potential −Va and ground potential.

Figure 5B:
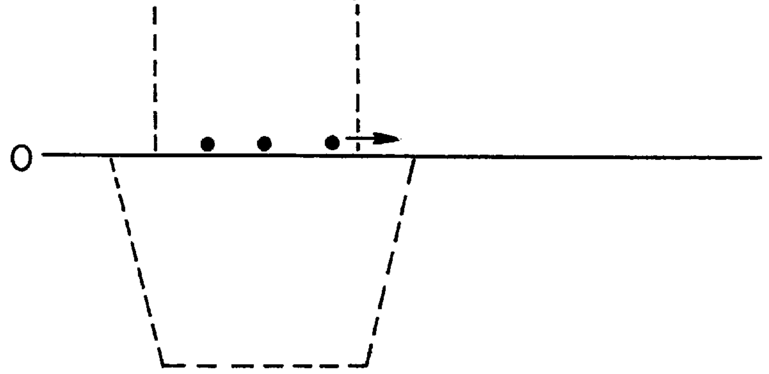

FIG. 5(*a*) illustrates the potentials at various locations in the instrument when the accelerating potential −Va is applied to the flight tube 26, as well as the movement of the ions. The ions are accelerated to high velocities by the accelerating potential −Va between the ion source 1 and the slit 3, pass through the slit 3, and enter the flight tube 26 to which the same accelerating potential −Va is applied. Since the analyzer 4 is at ground potential, the ions are inhibited from moving out of the flight tube 26 into the analyzer.

Accordingly, the potential is switched to ground potential by the voltage selector means in a response time sufficiently shorter than the time taken by the ions of the minimum mass (i.e., the ions accelerated to the highest velocity) to traverse the flight tube. FIG. 5(*b*) illustrates the potentials at various locations in the instrument when the flight tube 26 is placed at ground potential, as well as the movement of the ions. When the flight tube is grounded, the accelerated ions inside the flight tube can enter the analyzer 4 without change in speed, because the potential barrier with the analyzer no longer exists as shown in FIG. 5(*b*). In this analyzer, the ions are separated according to mass and sequentially detected by the detector 5.

After the ions that existed inside the flight tube when the potential at the flight tube was switched to ground potential have all moved into the analyzer, the selector means 8 switches the potential back to the accelerating potential. That is, the state of FIG. 5(*a*) is regained. These two states of FIGS. 5(*a*) and 5(*b*) are alternately repeated. In this way, a mass analysis can be performed repeatedly although in an intermittent manner under the condition of FIG. 5(*b*).

As described in detail thus far, a mass spectrometer in accordance with the present invention can perform a mass analysis by accelerating ions to high energies even if the ion source, the ion analyzer and the detector are at or near ground potential.

This spectrometer has a drift zone consisting of a conductive tube located in the ion path between the ion source and the analyzer. A voltage is applied to the drift zone from a voltage source via a switch such that the voltage applied to the drift zone is switched between a low potential V and an accelerating voltage Va of several kilovolts. The low potential V does not impede entry of ions. When the drift zone is at low negative potential V, ions generated by the ion source are accelerated by the low potential difference V into the drift zone. Then, the ions travel slowly through the drift zone and are accumulated. Under this condition, the potential at the drift zone is switched to the accelerating potential Va by the switch in a response time sufficiently shorter than the time taken by the ions to traverse the drift zone. The ions in the drift zone are accelerated to high energies from the exit by the potential difference Va with the slit that is at ground potential. Then, the ions reach the analyzer where they are separated according to mass. Finally, the ions reach a detector and are detected.

Having thus described my invention with the detail and particularity required by the Patent Laws, what is desired protected by Letters Patent is set forth in the following claims.

What is claimed is:

1. A mass spectrometer comprising:

an ion source placed at or near ground potential;

an ion analyzer for mass analyzing ions traveling in an ion path after being extracted from said ion source;

a detector for detecting ions emerging from said analyzer;

a drift zone located between said ion source and said analyzer and comprising a conductor surrounding said ion path, said drift zone having an entrance and an exit, said drift zone arranged for accepting the ions extracted from said ion source at said entrance for traversing said drift zone in a direction of movement to said exit in a transit time;

means for applying a high or low potential to said conductor; and a switching means for switching the potential at said conductor from a low potential to a high potential in a response time shorter than said transit time of the ions.

2. The mass spectrometer of claim 1, wherein a slit at ground potential is mounted at the exit of said drift zone.

3. The mass spectrometer of claim 1 or 2, wherein a potential gradient is produced along the direction of movement of the ions traveling through said drift zone.

4. The mass spectrometer of claim 1 or 2, wherein said switching means switches the potential at said conductor back to the low potential after the ions are discharged from said drift zone.

5. A mass spectrometer comprising:

an ion source placed at or near ground potential;

an ion analyzer for mass analyzing ions traveling in an ion path after being extracted from said ion source;

a detector for detecting ions emerging from said analyzer;

a flight tube located between said ion source and said analyzer and comprising a conductor surrounding said ion path, said flight tube accepting the ions extracted from said ion source, said ions traversing said flight tube in a time of flight;

means for applying a high or low potential to said flight tube; and a switching means for switching the potential at said flight tube from a high potential to ground potential or a nearly ground potential in a response time shorter than said time of flight.

6. The mass spectrometer of claim 5, wherein a slit is disposed between said ion source and said flight tube and maintained at a high potential to accelerate the ions produced in said ion source.

7. The mass spectrometer of claim 5 or 6, wherein said switching means switches the potential at said flight tube back to the high potential after the ions are discharged from said drift zone.

* * * * *